(12) United States Patent
Cheng et al.

(10) Patent No.: US 11,995,219 B2
(45) Date of Patent: May 28, 2024

(54) METHOD, ELECTRONIC EQUIPMENT, AND COMPUTER PROGRAM PRODUCT FOR DEVICE MANAGEMENT

(71) Applicant: EMC IP Holding Company LLC, Hopkinton, MA (US)

(72) Inventors: Qianyun Cheng, Chengdu (CN); Yuting Zhang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 430 days.

(21) Appl. No.: 17/238,849

(22) Filed: Apr. 23, 2021

(65) Prior Publication Data

US 2022/0188461 A1 Jun. 16, 2022

(30) Foreign Application Priority Data

Dec. 16, 2020 (CN) .......................... 202011486216.5

(51) Int. Cl.
*G06F 21/71* (2013.01)
*G06F 11/34* (2006.01)
(Continued)

(52) U.S. Cl.
CPC .......... *G06F 21/71* (2013.01); *G06F 11/3438* (2013.01); *G06F 18/214* (2023.01); *G06F 21/6218* (2013.01)

(58) Field of Classification Search
CPC .. G06F 21/71; G06F 21/6218; G06F 11/3438; G06F 18/214; G06F 9/451; G06F 9/45558; G06N 20/00
See application file for complete search history.

(56) References Cited

U.S. PATENT DOCUMENTS

2016/0364573 A1* 12/2016 Chan .................... G06F 21/6218
2018/0129373 A1* 5/2018 Ellis ...................... G06F 16/248
(Continued)

FOREIGN PATENT DOCUMENTS

CN 111104247 A 5/2020
CN 111459692 A 7/2020

OTHER PUBLICATIONS

First Office Action issued in the corresponding Chinese Patent Application No. 202011486216.5 mailed on Dec. 27, 2023 (14 pages).

*Primary Examiner* — Han Yang
(74) *Attorney, Agent, or Firm* — Chamberlain, Hrdlicka, White, Williams & Aughtry; Aly Z. Dossa (57) ABSTRACT

A device management method, an electronic device, and computer readable medium for presenting to a user device attributes that are more likely to be configured by the user to improve a device management system. The method may include acquiring a first device attribute set related to a plurality of devices. The first device attribute set includes at least one device attribute that has been configured by a user. The method may include determining a second device attribute set related to the plurality of devices. The second device attribute set includes device attributes different from the at least one device attribute described above. The method may include receiving configuration from the user for a device attribute in the second device attribute set and determining a to-be-processed device from the plurality of devices based on the configured device attributes in the first device attribute set and the second device attribute set.

15 Claims, 4 Drawing Sheets

(51) Int. Cl.
    *G06F 18/214*     (2023.01)
    *G06F 21/62*     (2013.01)

(56) References Cited

U.S. PATENT DOCUMENTS

| | | | |
|---|---|---|---|
| 2018/0131803 A1* | 5/2018 | Ellis | G06F 3/0483 |
| 2018/0343254 A1* | 11/2018 | Thomas | G06F 21/50 |
| 2019/0129807 A1 | 5/2019 | Zhang | |
| 2019/0318026 A1 | 10/2019 | Joseph et al. | |
| 2019/0324784 A1 | 10/2019 | Liang et al. | |
| 2022/0043714 A1* | 2/2022 | Chen | G06F 11/1461 |
| 2023/0116599 A1* | 4/2023 | Wang | G06F 11/1461 |
| | | | 711/162 |

* cited by examiner

METHOD, ELECTRONIC EQUIPMENT, AND COMPUTER PROGRAM PRODUCT FOR DEVICE MANAGEMENT

CROSS REFERENCE TO RELATED APPLICATION

This application claims priority under 35 U.S.C. § 119 to Chinese Patent Application No. 202011486216.5, filed on Dec. 16, 2020. The contents of Chinese Patent Application No. 202011486216.5 are incorporated by reference in its entirety.

TECHNICAL FIELD

Embodiments of the present disclosure generally relate to the field of computer networks, and in particular, to a device management method, an electronic device, and a computer program product.

BACKGROUND

When managing network devices, administrators usually configure some filter conditions to select a part of network devices from a large number of network devices, and provide corresponding processing strategies for these devices, such as device protection strategies. It should be understood that these filter conditions are usually specific types, numerical ranges, and combinations of device attributes, which are determined by the administrators for different device attributes. With the continuous development of computer network technologies, the granularity of the filter conditions continues to decrease, so a system supports more and more device attributes. Due to the size limitation of a graphical user interface (GUI), the number of device attributes that can be presented to a user is limited. Therefore, users can only manually input and search for some device attributes related to the filter conditions, which significantly increases the management cost.

SUMMARY OF THE INVENTION

The embodiments of the present disclosure provide a device management method, a device, and a corresponding computer program product.

In a first aspect of the present disclosure, a device management method is provided. The method may include acquiring a first device attribute set related to a plurality of devices. The first device attribute set includes at least one device attribute that has been configured by a user. The method may further include determining a second device attribute set related to the plurality of devices. The second device attribute set includes device attributes different from the at least one device attribute described above. The method further includes receiving configuration from the user for a device attribute in the second device attribute set. In addition, the method may further include determining a to-be-processed device from the plurality of devices based on the configured device attributes in the first device attribute set and the second device attribute set.

In one or more embodiments, determining the second device attribute set related to the plurality of devices may include applying the first device attribute set to a device attribute prediction model to determine the second device attribute set, where the device attribute prediction model is obtained from training with the first reference attribute set that has been configured as an input and with the second reference attribute set that has not been configured as an output.

In one or more embodiments, determining the second device attribute set related to the plurality of devices may include determining, based on the first device attribute set, a probability that each device attribute will be configured by the user and determining device attributes with a probability higher than a threshold probability to be included to the second device attribute set.

In one or more embodiments, the method may further include selecting a device protection strategy corresponding to the configured device attribute from a plurality of predetermined device protection strategies and protecting data in the to-be-processed device with the selected device protection strategy.

In one or more embodiments, the method may further include using the first device attribute set and the second device attribute set to further train the device attribute prediction model.

In one or more embodiments, the device attributes in the first device attribute set and the second device attribute set include at least one of an operating system type, a file system type, a file system size, a virtual machine name, and a virtual machine size.

In a second aspect of the present disclosure, an electronic device is provided. The device may include at least one processing unit and at least one memory, which is coupled to the at least one processing unit and stores machine-executable instructions. When executed by the at least one processing unit, the instructions cause the device to perform actions, and the actions may include: acquiring a first device attribute set related to a plurality of devices, the first device attribute set including at least one device attribute that has been configured by a user; determining a second device attribute set related to the plurality of devices, the second device attribute set including device attributes different from the at least one device attribute; receiving configuration from the user for the device attribute in the second device attribute set; and determining a to-be-processed device from the plurality of devices based on the configured device attributes in the first device attribute set and the second device attribute set.

In a third aspect of the present disclosure, a computer program product is provided. The computer program product is tangibly stored in a non-transitory computer-readable medium and includes machine-executable instructions, wherein when executed, the machine-executable instructions cause a machine to perform steps of the method according to the first aspect.

The Summary of the Invention is provided to introduce the selection of concepts in a simplified form, which will be further described in the detailed description below. The Summary of the Invention is neither intended to identify key features or main features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

DETAILED DESCRIPTION

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided so that this disclosure will be more thorough and complete, and can fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" means "at least one further embodiment." The terms "first," "second," etc. may refer to different or the same objects. Other explicit and implicit definitions may also be included below.

In order to achieve more fine-grained network device management, a network system usually contains more and more device attributes, thereby supporting more and more complex filter conditions. The problem currently existing is that there is not enough space on a graphical user interface to display all device attributes. When administrators want to use non-displayed device attributes to create filter conditions, they usually can neither see desired device attributes from a device list, nor obtain any information about these device attributes from the device list. For the administrators or other users, it is very difficult to use hidden device attributes to construct appropriate filter conditions, which is rather poor user experience.

One solution to the above-mentioned problem is to allow an administrator or user to manually define visible device attributes of the device list on his/her own. However, because the administrator usually uses different device attributes to construct various dynamic filter conditions, this solution requires the administrator to frequently and manually update the configurations of visible device attributes. Therefore, the solution does not improve the user experience.

In addition, another solution to solve the above-mentioned problem is to dynamically determine visible device attributes according to a selection by the administrator or the user. For example, after the administrator selects one device attribute, a user interface will immediately refresh the list of visible device attributes to ensure that the column of the device attribute is displayed in the list of visible device attributes. It can be seen that this solution also needs to select a corresponding device attribute, so a large number of manual inputs cannot be avoided, and the user experience has still not been improved.

In order to at least partially solve the above and other potential problems and defects, the embodiments of the present disclosure provide a solution for managing network devices, particularly a solution for preferentially displaying a part of device attributes for an administrator or user. In this solution, a prediction model needs to be trained in advance to predict, based on device attributes that have been configured by the administrator or user, a probability that other device attributes will be selected or configured by the administrator. After that, whenever the user configures the corresponding device attribute, the prediction model may predict the probability that other device attributes will be selected or configured, and then presents to the administrator one or more device attributes with a higher probability. The administrator can configure the presented device attributes and determine, based on these configurations, filter conditions for device management. Therefore, this solution can accurately and efficiently implement device management, so that user demands can be discovered in time, and appropriate device attributes can be recommended for users, thereby generating appropriate filter conditions, and also lowering the technical threshold of network device management. The basic idea of the present disclosure is discussed first in conjunction with FIG. 1 below.

Figure 1:
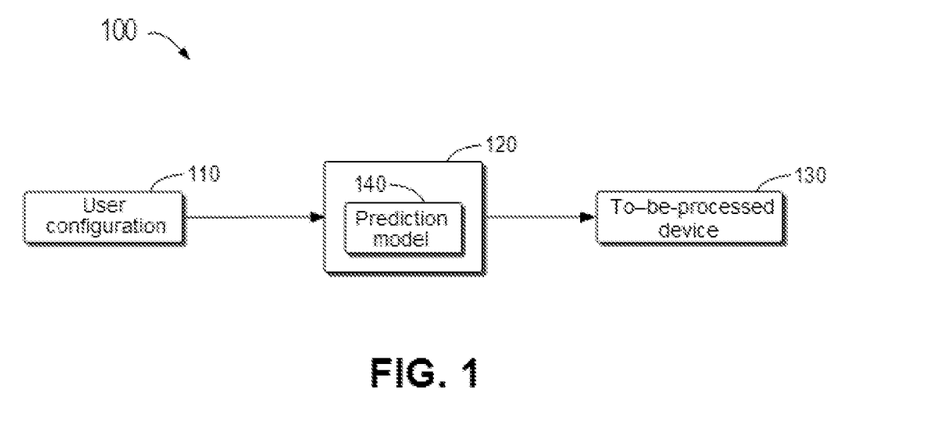
FIG. 1 shows a schematic diagram of an example environment in which a plurality of embodiments of the present disclosure can be implemented.

FIG. 1 shows a schematic diagram of example environment 100 in which a plurality of embodiments of the present disclosure can be implemented. As shown in FIG. 1, example environment 100 includes user configuration 110, computing device 120, and to-be-processed device 130. In FIG. 1, user configuration 110 may be information about configuration by the administrator or other users for the corresponding device attributes, so as to determine a dynamic filter condition for network devices that need to be managed. As an example, user configuration 110 may be a type or numerical range configured by the user for the corresponding device attribute. For example, for the case where the device attribute is an operating system, the user can configure the filter condition as selecting a network device with linux as the operating system from a plurality of network devices. In addition, the "dynamic" filter condition is embodied in that the filter condition can be changed at any time, and the device and the protection strategy can also change at any time. Whenever a change occurs, computing device 120 will regroup the devices based on the current filter condition.

It should be understood that the filter condition configured by the user will be input to computing device 120 as user configuration 110. Computing device 120 is configured to select, based on user configuration 110, part of network devices that meet the corresponding filter conditions from a plurality of network devices as to-be-processed device 130. Specifically, in order to simplify an operation process of the user, computing device 120 is provided with prediction model 140 used for predicting, based on a device attribute that has been configured by the user, a device attribute to be configured by the user, and preferentially presenting the predicted device attribute to the user. Computing device 120 may be an electronic device having a computing capacity, and includes, but is not limited to, a personal computer, a server computer, a handheld or laptop device, a mobile device (such as a mobile phone, a personal digital assistant (PDA), and a media player), a multiprocessors system, a consumer electronic product, a small computer, a mainframe computer, a working station, a server, a distributed computing environment including any of the above systems or devices, etc.

It should also be understood that the determination of to-be-processed device 130 by computing device 120 is intended to select a corresponding protection strategy for to-be-processed device 130. The protection strategy usually defines where, when, how, and how often data in a corresponding device is backed up. For example, the protection strategy may include various data backup methods, such as full data backup and updated data backup, and may also include a backup frequency, such as daily backup and weekly backup. It should be understood that the selection of the protection strategy for to-be-processed device 130 is only exemplary. The present disclosure focuses on selecting a to-be-processed device from the plurality of network devices, and is not limited to selecting the corresponding protection strategy for the to-be-processed device that meets the filter condition. Other operations may also be performed on the to-be-processed device that meets the filter condition.

The construction and use of prediction model 140 will be described below with reference to FIG. 2.

Figure 2:
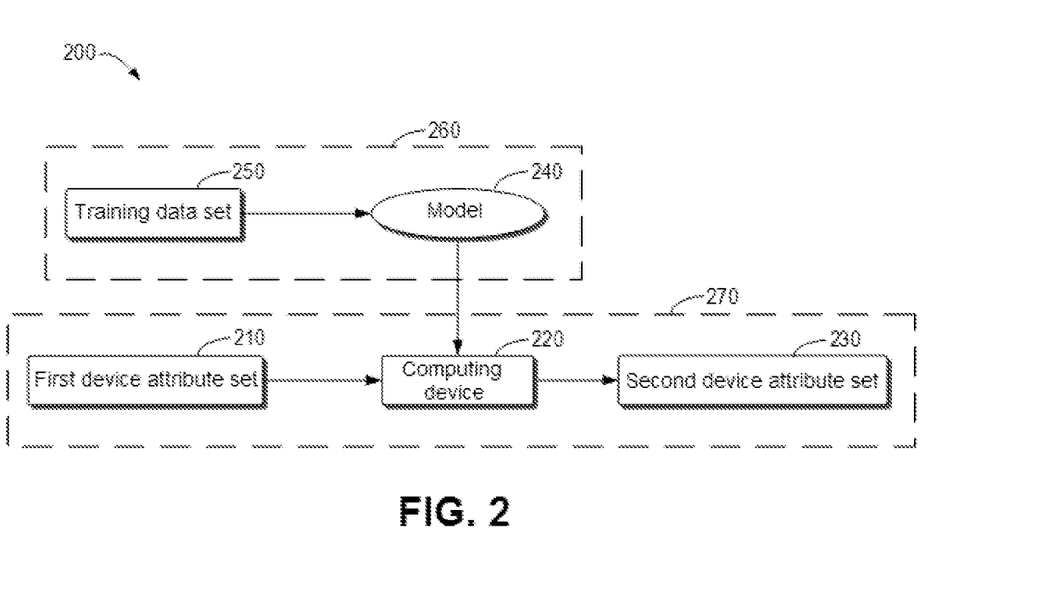
FIG. 2 shows a schematic diagram of a detailed example environment in which a plurality of embodiments of the present disclosure can be implemented.

FIG. 2 shows a schematic diagram of detailed example environment 200 in which a plurality of embodiments of the present disclosure can be implemented. Similar to FIG. 1, example environment 200 may include computing device 220, first device attribute set 210, and second device attribute set 230. Specifically, first device attribute set 210 includes at least one device attribute that has been configured by the user, and second device attribute set 230 includes at least one device attribute that has not been configured by the user. In addition, example environment 200 may generally include model training system 260 and model application system 270. As an example, model training system 260 and/or model application system 270 may be implemented in computing device 120 as shown in FIG. 1 or in computing device 220 as shown in FIG. 2. It should be understood that the structure and function of example environment 200 are described for illustrative purpose only, and do not imply any limitation to the scope of the subject described in this text. The subject described herein can be implemented in different structures and/or functions.

As mentioned above, the solution for predicting a device attribute to be configured by the user according to the present disclosure may be divided into two stages: a model training stage and a model application stage. At the model training stage, model training system 260 may use training data set 250 to train model 240 used for predicting a device attribute to be configured by the user. At the model application stage, model application system 270 may receive trained model 240 and first device attribute set 210, so as to determine second device attribute set 230. In one or more embodiments, training data set 250 may be a labeled reference attribute set. For example, the training data set may take first reference attribute set by the user as an input of model 240 and take second reference attribute set not configured by the user as an output of model 240, so as to train model 240.

It should be understood that model 240 may also be constructed as a deep learning network used for predicting a device attribute to be configured by the user. Such a deep learning network may also be called a deep learning model. In one or more embodiments, the deep learning network used for predicting a device attribute to be configured by the user may include a plurality of networks, and each network may be one multi-layer neural network that may be composed of a large number of neurons. Through a training process, corresponding parameters of the neurons in each network may be determined.

The technical solution described above is only used as an example, instead of limiting the present disclosure. In order to explain the principle of the above solution more clearly, the process of determining the to-be-processed device will be described in more detail below with reference to FIG. 3.

Figure 3:
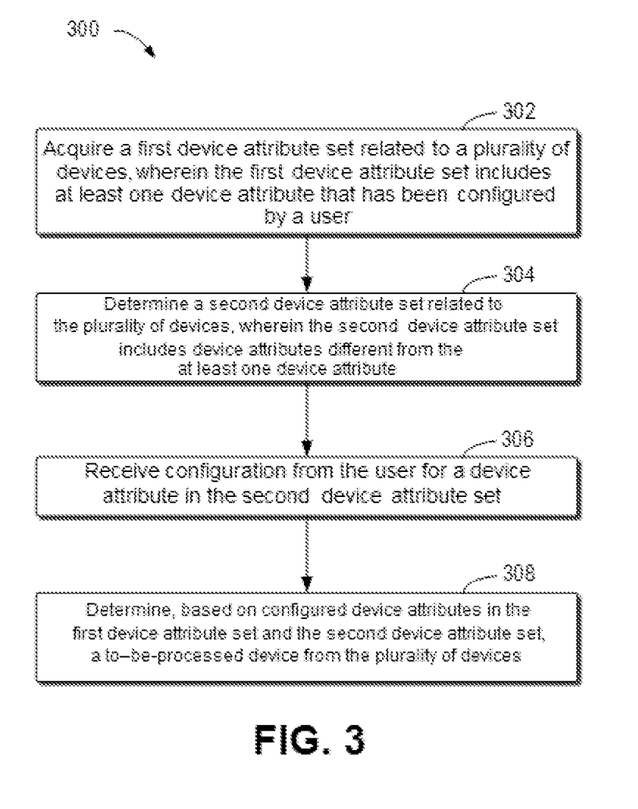
FIG. 3 shows a flowchart of a process for managing devices according to one or more embodiments of the present disclosure.

FIG. 3 shows a flowchart of process 300 for managing devices according to one or more embodiments of the present disclosure. In one or more embodiments, process 300 may be implemented in a device shown in FIG. 5. For example, process 300 may be implemented in computing device 120 shown in FIG. 1 or computing device 220 shown in FIG. 2. Process 300 used for predicting a device attribute to be configured by the user according to the embodiment of the present disclosure is now described with reference to FIG. 3. For ease of understanding, specific data mentioned in the following description are all exemplary and are not intended to limit the scope of protection of the present disclosure.

At 302, computing device 220 may acquire first device attribute set 210 related to a plurality of devices. As an example, first device attribute set 210 may include at least one device attribute that has been configured by the user. In one or more embodiments, first device attribute set 210 may include various device attributes, such as an operating system type, a file system type, a file system size, a virtual machine name, a virtual machine size, a virtual machine tag (VM Tag), a database size, a data center name, and a resource pool. If part of these device attributes belongs to first device attribute set 210, it is indicated that this part of the device attributes is device attributes that have been configured by the user. Computing device 220 may determine, based on these device attributes and in subsequent operations, device attributes that the user wants to keep on configuring.

At 304, computing device 220 may determine second device attribute set 230 related to these devices. As an example, second device attribute set 230 includes device attributes different from the aforementioned at least one device attribute configured by the user. In other words, computing device 220 may predict, based on at least one device attribute that has been configured by the user, one or more device attributes to be configured by the user.

In one or more embodiments, in order to determine second device attribute set 230 related to these devices, computing device 220 may apply first device attribute set 210 to model 240 configured to predict device attributes, so as to determine second device attribute set 230. Model 240 may be obtained from training with a first reference attribute set that has been configured by the user as an input and with a second reference attribute set that has not been configured by the user as an output, and the first reference attribute set and the second reference attribute set are training data sets 250. It should be understood that training data sets 250 are labeled data. By using model 240 to predict second device attribute set 230, referable recommendations can be provided to the user, thereby reducing manual operations of the user. At the same time, a prediction result of model 240 can provide guidance for unexperienced users, thereby lowering the technical barrier of network device management.

As an example, a historical operation of a user serving as an administrator for configuration the filter conditions used for managing the network devices may be used as training data set 250. For example, when the model is configured to predict a next device attribute based on one or more device attributes that have been configured, the Nth to (N+M−1)th device attributes configured by the user in the historical data can be used as an input of model 240, and the (N+M)th device attribute configured by the user in the historical data can be used as an input of model 240. Both N and M are integers greater than or equal to one. In addition, the training data set can be finally processed to be expressed by a plurality of features in a vector form based on a One Hot Encoding (OHE) technology, so as to facilitate model training.

In one or more embodiments, computing device 220 may also determine, based on first device attribute set 210, the probability that each device attribute will be configured by the user. It should be understood that aforementioned model 240 can be used to determine, based on first device attribute set 210, the probability that other device attributes or all device attributes are to be selected or configured by the user. Furthermore, computing device 220 may determine one or more device attributes with a higher probability (for example, higher than a predetermined threshold) to be included to second device attribute set 230, or is second device attribute set 230 itself. In this way, a device attribute with a higher probability can be recommended for the user, and in most cases, the recommended device attribute is the device attribute that the user wants to configure, thereby saving the labor cost of the user.

At 306, computing device 220 may receive the configuration from the user for the device attributes in second device attribute set 230. In other words, after model 240 in computing device 220 determines second device attribute set 230, computing device 220 is configured to present second device attribute set 230 to the user. The user can select at least one device attribute in second device attribute set 230 and configure the same.

Then, at 308, computing device 220 may determine one filter condition based on configured device attributes in first device attribute set 210 and second device attribute set 230, and determine to-be-processed device 130 that meets the filter conditions from the plurality of devices.

Furthermore, computing device 220 may select one protection strategy from a plurality of predetermined device protection strategies, and the protection strategy corresponds to the foregoing device attributes that have been configured. In other words, the protection strategy corresponds to the filter conditions configured by the user. Later, computing device 220 can protect the data in to-be-processed device 130 according to the selected protection strategy. For example, protection strategies at different levels can be selected according to the type of to-be-processed device 130. It should be understood that the selection of the protection strategy for to-be-processed device 130 is only exemplary. The present disclosure focuses on selecting to-be-processed device 130 from the plurality of network devices, and is not limited to selecting the corresponding protection strategy for to-be-processed device 130 that meets the filtering conditions. Other operations may be performed on to-be-processed device 130 that meets the filter conditions. For example, what devices needing to be replaced are determined based on the filter conditions related to the service time.

By implementing the above-mentioned embodiments, the present disclosure can present to the user the device attributes that are more likely to be configured by the user, thereby improving the intelligence level of the entire device management system. By using the device management system of the present disclosure, the user can conveniently configure the filter conditions for the devices, so as to provide corresponding services for specific types of devices in a timely and accurate manner. In addition, the embodiments of the present disclosure lower the technical threshold for network device management, and can provide unexperienced users with reference and guidance such as at least one device attribute in second device attribute set 230.

Figure 4:
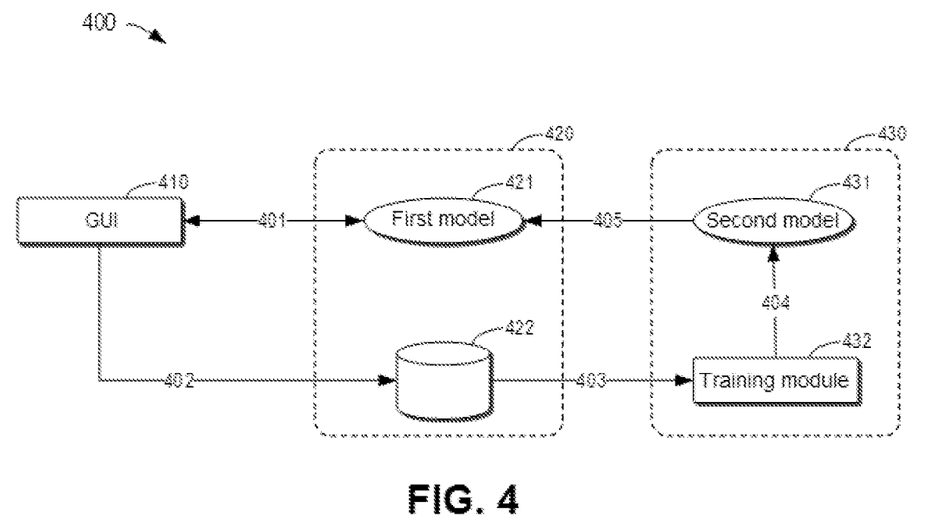
FIG. 4 shows a schematic diagram of a process of using and updating a model according to one or more embodiments of the present disclosure.

In addition to the foregoing embodiments, in order to optimize the prediction accuracy of model 240, first device attribute set 210 and second device attribute set 230 may be used as training data to continue to train model 240. FIG. 4 shows a schematic diagram of a process of using and updating a model according to one or more embodiments of the present disclosure.

On one hand, as shown in FIG. 4, graphical user interface (GUI) 410 interacts with first model 421 in application server 420 (401). Specifically, the user can configure first device attribute set 210 through GUI 410. At this time, the configuration information is uploaded to first model 421 in application server 420. First model 421 determines second device attribute set 230 based on first device attribute set 210, and presents second device attribute set 230 to the user, so that the user can further configure more device attributes, thereby improving the filter conditions.

On the other hand, the user can select to at least upload historical operation data associated with first device attribute set 210 and second device attribute set 230, so as to train a more personalized prediction model, thereby improving the user experience. Specifically, the user can upload the historical operation data to data storage device 422 in application server 420 through GUI 410 (402). Furthermore, these operation data are processed and transmitted to training module 432 in training server 430 (403). Training module 432 can train second model 431 in server 430 by taking first device attribute set 210 as an input of the model and taking second device attribute set 230 as an output of the model (404). After second model 431 is trained, first model 421 is updated or upgraded based on parameters of second model 431 (405). By regularly training the prediction model by using the operation data of the user, the accuracy of the model prediction can be further improved, and personalized services can be provided for each user.

Figure 5:
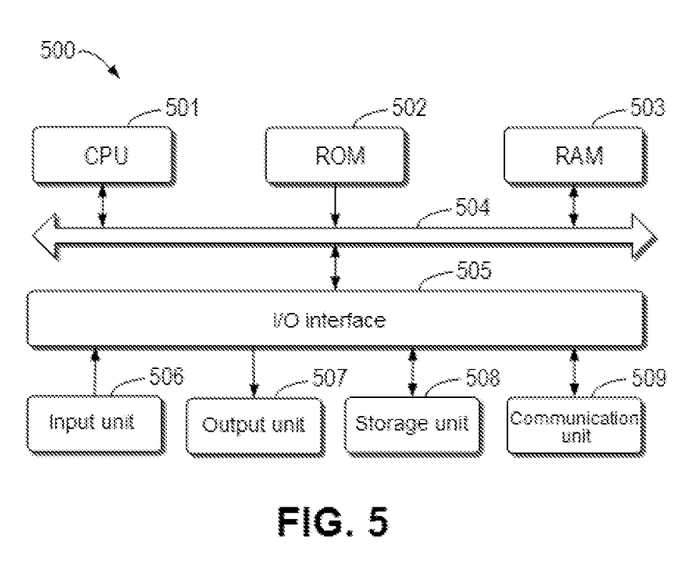
FIG. 5 shows a block diagram of a computing device that can be configured to implement a plurality of embodiments of the present disclosure.

FIG. 5 shows a block diagram of computing device 500 that can be configured to implement a plurality of embodiments of the present disclosure. As shown in the drawing, computing device 500 includes central processing unit (CPU) 501 that may perform various appropriate actions and processing according to computer program instructions stored in read-only memory (ROM) 502 or computer program instructions loaded from storage unit 508 into random access memory (RAM) 503. In RAM 503, various programs and data required for the operation of computing device 500 may also be stored. CPU 501, ROM 502, and RAM 503 are connected to each other through bus 504. Input/output (I/O) interface 505 is also connected to bus 504.

A plurality of components in computing device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows computing device 500 to exchange information/data with other devices through a computer network such as the Internet and/or various telecommunication networks.

The various processes and processing described above, such as process 300, may be performed by processing unit 501. For example, in one or more embodiments, process 300 may be implemented as a computer software program that is tangibly included in a machine-readable medium, for example, storage unit 508. In one or more embodiments, part or all of the computer programs may be loaded and/or installed to computing device 500 via ROM 502 and/or communication unit 509. When the computer program is loaded into RAM 503 and executed by CPU 501, one or more actions of process 300 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state configuration data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any type of network—including a local area network (LAN) or a wide area network (the WAN), or may be connected to an external computer (e.g., connected over the Internet by using an Internet service provider). In one or more embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented using computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or technical improvements to technologies in the market, or to enable other persons of ordinary skill in the art to understand the embodiments disclosed herein.

The invention claimed is:

1. A device management method, comprising:
   acquiring a first device attribute set related to a plurality of devices, wherein the first device attribute set includes at least one device attribute that has been configured by a user;
   determining a second device attribute set related to the plurality of devices, wherein the second device attribute set includes a second device attribute different from the at least one device attribute, wherein determining the second device attribute set related to the plurality of devices comprises:
      applying the first device attribute set to a device attribute prediction model to determine the second device attribute set,
      wherein the device attribute prediction model is obtained from training with a first reference attribute set that has been configured as an input and taking a second reference attribute set that has not been configured as an output;
   receiving a user configuration from the user for the second device attribute in the second device attribute set;
   determining a filter condition based on the at least one device attribute and the second device attribute; and
   determining a to-be-processed device from the plurality of devices that satisfies the filter condition,
      wherein the filter condition corresponds to a protection strategy from a plurality of predetermined protection strategies,
      wherein data in the to-be-processed device is protected according to the protection strategy.

2. The device management method according to claim 1, wherein determining the second device attribute set related to the plurality of devices comprises:
   determining, based on the first device attribute set, a probability that each device attribute will be configured by the user; and
   determining device attributes with a probability higher than a threshold probability to be included to the second device attribute set.

3. The device management method according to claim 1, further comprising:
   selecting a device protection strategy corresponding to the configured device attribute from a plurality of predetermined device protection strategies; and
   protecting data in the to-be-processed device with the selected device protection strategy.

4. The device management method according to claim 1, further comprising:
using the first device attribute set and the second device attribute set to further train the device attribute prediction model.

5. The device management method according to claim 1, wherein device attributes in the first device attribute set and the second device attribute set comprise at least one of:
   an operating system type;
   a file system type;
   a file system size;
   a virtual machine name; and
   a virtual machine size.

6. An electronic device, comprising:
   at least one processing unit; and
   at least one memory, coupled to the at least one processing unit and having machine-executable instructions stored thereon, wherein when executed by the at least one processing unit, the instructions cause the device to perform actions, and the actions comprising:
      acquiring a first device attribute set related to a plurality of devices, wherein the first device attribute set includes at least one device attribute that has been configured by a user;
      determining a second device attribute set related to the plurality of devices, wherein the second device attribute set includes a second device attribute different from the at least one device attribute, wherein determining the second device attribute set related to the plurality of devices comprises:
         applying the first device attribute set to a device attribute prediction model to determine the second device attribute set,
         wherein the device attribute prediction model is obtained from training with a first reference attribute set that has been configured as an input and taking a second reference attribute set that has not been configured as an output;
      receiving a user configuration from the user for the second device attribute in the second device attribute set;
      determining a filter condition based on the at least one device attribute and the second device attribute; and
      determining a to-be-processed device from the plurality of devices that satisfies the filter condition,
         wherein the filter condition corresponds to a protection strategy from a plurality of predetermined protection strategies,
         wherein data in the to-be-processed device is protected according to the protection strategy.

7. The electronic device according to claim 6, wherein determining the second device attribute set related to the plurality of devices comprises:
   determining, based on the first device attribute set, a probability that each device attribute will be configured by the user; and
   determining device attributes with a probability higher than a threshold probability to be included to the second device attribute set.

8. The electronic device according to claim 6, wherein the actions further comprise:
   selecting a device protection strategy corresponding to the configured device attribute from a plurality of predetermined device protection strategies; and
   protecting data in the to-be-processed device with the selected device protection strategy.

9. The electronic device according to claim 6, wherein the actions further comprise:

using the first device attribute set and the second device attribute set to further train the device attribute prediction model.

10. The electronic device according to claim 6, wherein device attributes in the first device attribute set and the second device attribute set comprise at least one of:
an operating system type;
a file system type;
a file system size;
a virtual machine name; and
a virtual machine size.

11. A non-transitory computer readable medium comprising computer readable program code, which when executed by a computer processor enables the computer processor to perform a method for device management, the method comprising:
acquiring a first device attribute set related to a plurality of devices, wherein the first device attribute set includes at least one device attribute that has been configured by a user;
determining a second device attribute set related to the plurality of devices, wherein the second device attribute set includes a second device attribute different from the at least one device attribute, wherein determining the second device attribute set related to the plurality of devices comprises:
applying the first device attribute set to a device attribute prediction model to determine the second device attribute set,
wherein the device attribute prediction model is obtained from training with a first reference attribute set that has been configured as an input and taking a second reference attribute set that has not been configured as an output;
receiving a user configuration from the user for the second device attribute in the second device attribute set;
determining a filter condition based on the at least one device attribute and the second device attribute; and
determining a to-be-processed device from the plurality of devices that satisfies the filter condition,
wherein the filter condition corresponds to a protection strategy from a plurality of predetermined protection strategies,
wherein data in the to-be-processed device is protected according to the protection strategy.

12. The non-transitory computer readable medium of claim 11, wherein determining the second device attribute set related to the plurality of devices comprises:
determining, based on the first device attribute set, a probability that each device attribute will be configured by the user; and
determining device attributes with a probability higher than a threshold probability to be included to the second device attribute set.

13. The non-transitory computer readable medium of claim 11, further comprising:
selecting a device protection strategy corresponding to the configured device attributes from a plurality of predetermined device protection strategies; and
protecting data in the to-be-processed device with the selected device protection strategy.

14. The non-transitory computer readable medium of claim 11, further comprising:
using the first device attribute set and the second device attribute set to further train the device attribute prediction model.

15. The non-transitory computer readable medium of claim 11, wherein device attributes in the first device attribute set and the second device attribute set comprise at least one of:
an operating system type;
a file system type;
a file system size;
a virtual machine name; and
a virtual machine size.

\* \* \* \* \*